(12) United States Patent
Lyapunov et al.

(10) Patent No.: US 12,331,738 B2
(45) Date of Patent: Jun. 17, 2025

(54) MONITORING THE PERFORMANCE OF HYDRAULIC PUMPING EQUIPMENT

(71) Applicant: SCHLUMBERGER TECHNOLOGY CORPORATION, Sugar Land, TX (US)

(72) Inventors: Konstantin Mikhailovich Lyapunov, Novosibirsk (RU); Ivan Vladimirovich Velikanov, Lysaker (NO); Sergey Dmitrievich Parkhonyuk, Moscow (RU); Denis Viktorovich Bannikov, Sugar Land, TX (US); Danil Sergeyevich Pantsurkin, Novosibirsk (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/718,245

(22) PCT Filed: Dec. 10, 2021

(86) PCT No.: PCT/RU2021/000562
§ 371 (c)(1),
(2) Date: Jun. 10, 2024

(87) PCT Pub. No.: WO2023/106955
PCT Pub. Date: Jun. 15, 2023

(65) Prior Publication Data
US 2024/0418162 A1     Dec. 19, 2024

(51) Int. Cl.
*F04B 51/00*     (2006.01)
*B01F 25/10*     (2022.01)
(Continued)

(52) U.S. Cl.
CPC .............. *F04B 51/00* (2013.01); *B01F 25/10* (2022.01); *B01F 35/10* (2022.01);
(Continued)

(58) Field of Classification Search
CPC ...... F04B 51/00; B01F 35/2213; B01F 35/10; B01F 25/10; G05B 23/0254; G05B 23/0283
See application file for complete search history.

(56) References Cited

U.S. PATENT DOCUMENTS 4,389,877 A     6/1983   Lacey
4,838,701 A *   6/1989   Smith ................... B01F 25/103
                                                  366/136

(Continued)

FOREIGN PATENT DOCUMENTS

JP     2010020452 A     1/2010
JP     2018040595 A     3/2018
(Continued)

OTHER PUBLICATIONS

International Search Report and Written Opinion issued in International Patent Appl. No. PCT/RU2021/000562 on Sep. 1, 2022; 7 pages.

*Primary Examiner* — Elias Desta
(74) *Attorney, Agent, or Firm* — Jeffrey D. Frantz

(57) ABSTRACT

Mixing equipment for hydraulic fracturing operations undergoes wear with continued use. Monitoring the performance of the mixing equipment and predicting failure may be performed by measuring discharge pressures or hydrodynamic acoustic noise. Computer modeling and machine learning may be employed to help operators decide whether to take equipment out of service for maintenance or to allow the equipment to continue operating.

20 Claims, 1 Drawing Sheet

(51) Int. Cl.
 B01F 35/10 (2022.01)
 B01F 35/221 (2022.01)
 *G05B 23/02* (2006.01)

(52) U.S. Cl.
 CPC ...... B01F 35/2213 (2022.01); *G05B 23/0254* (2013.01); *G05B 23/0283* (2013.01)

(56) References Cited

U.S. PATENT DOCUMENTS

| | | |
|---|---|---|
| 5,720,598 A | 2/1998 | de Chizzelle |
| 7,594,434 B2 | 9/2009 | Dagnenais et al. |
| 8,771,524 B2 * | 7/2014 | Vorage .................... B01J 19/24 |
| | | 210/512.1 |
| 9,650,881 B2 | 5/2017 | Clem |
| 10,363,684 B2 * | 7/2019 | Roberts .................. B28C 5/422 |
| 10,674,863 B2 * | 6/2020 | Sevcik .................... B67D 1/004 |
| 2002/0128790 A1 | 9/2002 | Woodmansee |

FOREIGN PATENT DOCUMENTS

| | | |
|---|---|---|
| RU | 2367970 C2 | 9/2009 |
| RU | 2654889 C1 | 5/2018 |
| RU | 2678712 C1 | 1/2019 |

* cited by examiner

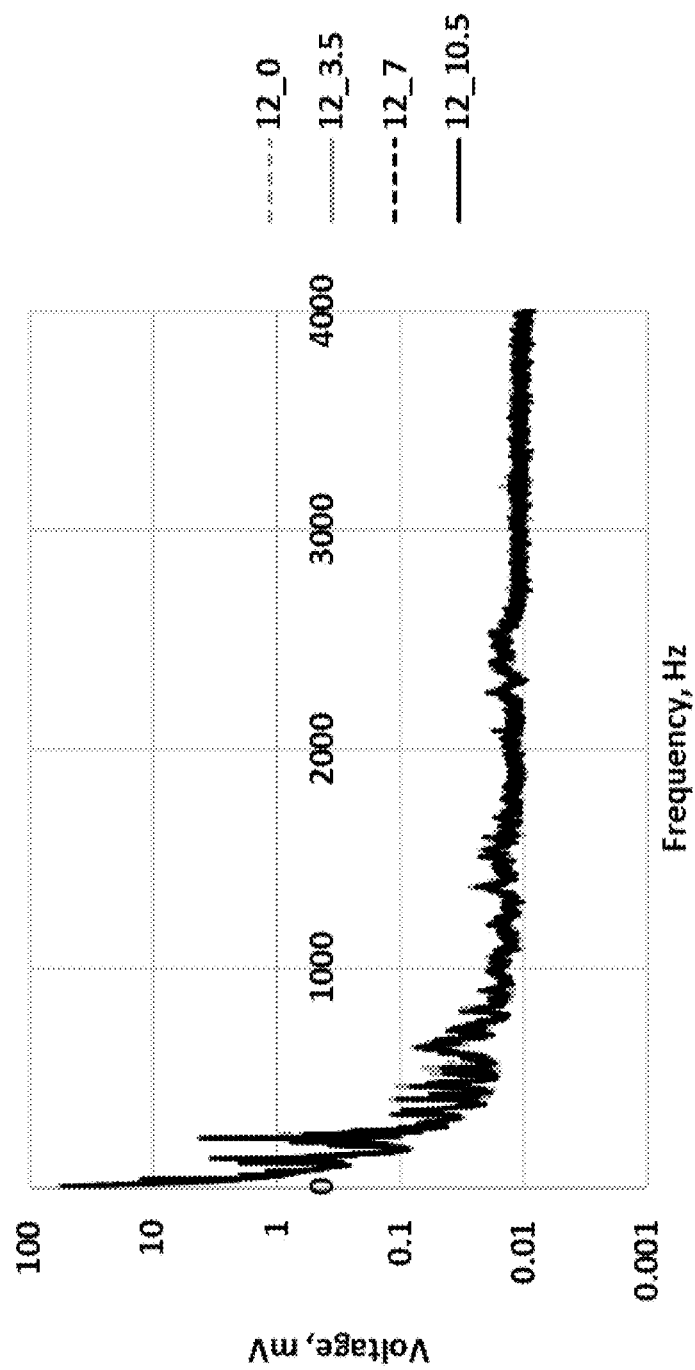

MONITORING THE PERFORMANCE OF HYDRAULIC PUMPING EQUIPMENT

BACKGROUND

This application is a National Stage and claims benefit of PCT Patent Application No. PCT/RU2021000562W, entitled "Monitoring the Performance of Hydraulic Pumping Equipment," filed on Dec. 10, 2021, which is hereby incorporated by reference in its entirety for all purposes. The statements in this section merely provide background information related to the present disclosure and may not constitute prior art.

Multiplex pumps, which include a plurality of chambers, have been used extensively for many years for pumping high volumes of fluids at high pressure. These pumps are of the "positive displacement" type; that is they move fluid by a positive displacement mechanism and generate a discharge stream having pressure fluctuations resulting from the positive displacement action of the pump. Multiplex pumps include, but are not limited to, plunger-and-cylinder pumps, diaphragm pumps, gear pumps, external circumferential piston pumps, internal circumferential piston pumps, lobe pumps, and the like.

While all of these positive displacement multiplex pump types are used for various applications, the most frequently used multiplex pump in the oil field industry is the plunger-and-cylinder pump. The plungers in these pumps are usually driven by a common drive shaft or gearing so that the entire pump operates at a single frequency (RPM). The separate plunger-and-cylinder assemblies are formed as an integral part of the multiplex pump and are commonly referred to and will be referred to herein as cylinders. The variable volume chambers used in other types of positive displacement pumps are referred to herein as chambers.

These types of multiplex pumps are well known to the art and are widely used for fracturing, cementing, drilling, chemical additive pumping systems, water control, well acidizing, and the like. The pump requirements for operations of this type include a requirement for high reliability and continuous high volume and high pressure fluid flow.

One application which is particularly demanding is fracturing. In fracturing operations a fluid is pumped down a wellbore at a flow rate and pressure sufficient to fracture a subterranean formation. After the fracture is created or, optionally, in conjunction with the creation of the fracture, proppants may be injected into the wellbore and into the fracture. The proppant is a particulate material added to the pumped fluid to produce a slurry. Pumping this slurry at the required flow rate and pressure is a severe pump duty. In fracturing operations each pump may be required to pump up to twenty barrels per minute at pressures up to 20,000 psi. The pumps for this application are quite large and are frequently moved to the oil field on semi-trailer trucks or the like. Many times a single multiplex pump will occupy the entire truck trailer. These pumps are connected together at the well site to produce a pumping system which may include several multiplex pumps. A sufficient number of pumps are connected to a common line to produce the desired volume and pressure output. Some fracturing jobs have required up to 36 pumps.

Since fracturing operations are desirably conducted on a continuous basis, the disruption of a fracture treatment because of a pump failure is very undesirable. Further, when such massive pumps are used, it is difficult in some instances to determine, in the event of a pump failure, which pump has failed. Because of the severe pump duty and the frequent failure rate of such pumps, it is normal to take thirty to one hundred percent excess pump capacity to each fracture site. The necessity for the excess pump capacity requires additional capital to acquire the additional multiplex pumps and considerable expense to maintain the additional pumps and to haul them to the site. Presently, multiplex pumps are frequently disassembled and inspected after each fracture treatment and, in some instances, routinely rebuilt after each fracture treatment in an attempt to avoid pump failures during subsequent fracture treatments.

In fracturing and other uses for multiplex pumps, methods have been developed for determining, in advance, when pumps are defective so that pump failures during operations can be avoided. However, it would be further desirable for operators to have the ability to predict failure of equipment employed to prepare fracturing fluids, during which fluids and proppants are blended in a high-shear environment. One such mixer is commonly called a vortex mixer, exemplified by the POD™ Stimulation blender, available from Schlumberger.

SUMMARY

The present disclosure proposes methods for monitoring the performance of mixing and pumping equipment for hydraulic fracturing operations.

In an aspect, embodiments relate to methods for monitoring vortex mixer performance. Discharge pressures versus revolutions per minute (RPM) are measured in a new vortex mixer. Discharge pressures versus RPM are measured in a worn vortex mixer. A discharge pressure drift rate is estimated versus RPM. Then, a time required for the discharge pressure versus RPM in a new mixer to reach a condition corresponding to that of a worn vortex mixer is calculated.

In a further aspect, embodiments relate to methods for evaluating erosion of pumping equipment and estimating residual lifetime. Hydrodynamic noise spectra are measured from new pumping equipment. Hydrodynamic noise spectra are measured from worn pumping equipment. A drift rate of the hydrodynamic noise spectra is estimated. Then, a time required for the hydrodynamic noise spectra to reach that corresponding to worn pumping equipment is calculated.

BRIEF DESCRIPTION OF THE DRAWINGS

FIG. 1 shows hydrodynamic acoustic noise spectra for a vortex mixer without any defects, and three spectra with 12-mm cavities in the wall.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Numerous methods have been presented in the industry for monitoring the performance of mixing and pumping equipment.

U.S. Pat. No. 4,389,877A, "Piping Erosion Monitoring System," presents system to monitor the amount of erosion taking place within a pipe in which a point of reduced strength of the pipe is made by drilling a hole or notch to a preselected depth in a selected portion of the pipe wall. A hollow casing is provided around the point of reduced strength to provide a sealed zone. A conduit in the hollow casing is connected to a sensing device to monitor pressure changes when pipe failure occurs at the hole or notch.

U.S. Pat. No. 5,720,598, "Method and a System for Early Detection of Defects in Multiplex Positive Displacement Pumps," presents method for monitoring of erosion of valves of multiplex pumps. When a valve isolating a high pressure chamber closes, it causes a small pressure spike. The frequency of the spike decreases as the valve becomes worn and begins failing to isolate the chamber properly. Frequency spectra are used for the analysis.

U.S. Pat. No. 7,594,434, "System and Method for Monitoring Erosion," describes a system and method for monitoring erosion caused by an erosive agent such as fluids containing particulate matter including formation sand, gravel or proppants that flow through downhole tools, downhole tubulars, flow lines and surface processing equipment during completion and production operations. Erosion is monitored with some sensors installed in a downhole tool. Sensors may be active or passive. The detector interrogates the sensors to determine whether a predetermined level of erosion has occurred in the proximity of the sensor. How and why the sensors work is not described.

U.S. Pat. No. 9,650,881, "Real Time Tool Erosion Prediction Monitoring," discloses a method of determining an erosion rate of a tool used in downhole applications and, in particular, determining a lifetime of a tool using in-situ measurements of pumping parameters. The pumping parameters includes at least one of: (i) a fluid flow rate; (ii) a fluid viscosity; (iii) proppant type; (iv) proppant size; (v) proppant density.

US Patent Application 2002/0128790A1, "System and Method of Automated Part Evaluation Including Inspection, Disposition Recommendation and Refurbishment Process Determination," presents a system and method for evaluating parts to determine their status or disposition, and, if a part is salvageable, to subsequently recommend a process to refurbish the part. More particularly, the present invention relates to an automated method for inspecting parts prior to refurbishment and re-installation. The method uses automated coordinate measuring machines and imagers, image analysis software, and rules-based, logical disposition software.

Japan Patent JP2010020452A, "Erosion Prediction/Evaluation Method and Device," discloses prediction or evaluation techniques concerning erosion of the piping through which a fluid flows; in particular, by applying finite element method analysis on the prediction and evaluation of erosion, virtually simulated by calculating the microfracture. It relates to a method and apparatus to predict and evaluate the erosion.

Japan Patent JP2018040595A, "Device and Method of Predicting Erosion of Hydraulic Machinery," discloses a device and method for providing accurate prediction of erosion of a hydraulic machine, which reflects condition of the actual machine. A hydraulic machinery erosion prediction device comprises a sensor that is coupled to a hydraulic machine to sense occurrence of cavitation; an erosion amount derivation unit configured to compare data acquired by the sensor with a relation between impact force of cavitation measured in an experiment with a laboratory hydraulic machine and the amount of erosion caused by the impact force on the laboratory hydraulic machine to derive a predicted erosion amount; and an arithmetic processing device configured to perform a numerical fluid analysis of the hydraulic machine and output an analysis result. The arithmetic processing device has an arithmetic processing unit for performing the numerical fluid analysis based on operating conditions of the hydraulic machine, and a performance prediction unit for predicting actual machine performance on the basis of the result of the numerical fluid analysis, and is configured to create a shape model for the hydraulic machine using the predicted erosion amount and the actual machine performance.

In this disclosure, hydrodynamic acoustic noise because of turbulence in a flowing fluid is measured in fracturing blenders or other fracturing equipment such as pumps, surface treating lines, etc. The purpose is to monitor erosion of such equipment caused by proppants and other solids. Spectra of hydrodynamic acoustic noise are analyzed and the current condition of equipment and residual lifetime are estimated using direct comparison with reference spectra or using machine learning methods, ensemble models, neural networks, deep learning methods or theoretical models.

In an aspect, embodiments relate to methods for monitoring vortex mixer performance. Discharge pressures versus revolutions per minute (RPM) are measured in a new vortex mixer. Discharge pressures versus RPM are measured in a worn vortex mixer. A discharge pressure drift rate is estimated versus RPM. Then, a time required for the discharge pressure versus RPM in a new mixer to reach a condition corresponding to that of a worn vortex mixer is calculated.

In a further aspect, embodiments relate to methods for evaluating erosion of pumping equipment and estimating residual lifetime. Hydrodynamic noise spectra are measured from new pumping equipment. Hydrodynamic noise spectra are measured from worn pumping equipment. A drift rate of the hydrodynamic noise spectra is estimated. Then, a time required for the hydrodynamic noise spectra to reach that corresponding to worn pumping equipment is calculated.

This disclosure considers fluid flow around some object or through some channel. If turbulent flow is locally achieved, hydrodynamic acoustic noise is generated. Spectra of hydrodynamic acoustic noise depends not only on fluid viscosity, fluid density and fluid velocity, but also on specific local geometric parameters of the channel or the geometry of the object. For example, in case of a cavity in the wall of a channel, it depends on depth, width and length of the cavity. In the case of an object, it depends on height, width and length. Any change in geometry of the object or in the geometry of channel like cavities in walls or changes of width between walls etc., may change the hydrodynamic acoustic noise spectra. Therefore, monitoring the evolution of hydrodynamic acoustic noise spectra may be used to evaluate the severity of damage to a mixer due to erosion by proppant. The same method may be used to monitor the condition of other fracturing equipment such as high-pressure pumps, manifolds, surface treating lines and their elements.

Hydrodynamic acoustic noise spectra may be measured in flowing fluids during the following:
- operating a fracturing blender or other fracturing equipment during a hydraulic fracturing operation;
- priming treating line and pumps with water during fracturing job preparation;
- circulating water through surface treating line and pumps with a fracturing blender during fracturing job preparation; and
- pumping fluids through a fracturing blender or other fracturing equipment using an external fluid pump.

Sensors and equipment that may be used to practice the disclosed methods include hydrophones and acquisition systems able to acquire hydrodynamic noise having a frequency up to 100 KHz.

A workflow for the disclosure may comprise:
- installing hydrophones or high frequency pressure sensors in a vortex mixer operating between 500 and 5000 RPM, triplex pump, surface treating line or manifold;
- measuring hydrodynamic acoustic noise spectra; and
- performing an analysis of the hydrodynamic noise spectra or comparing the spectra to calibrated or reference spectra for new and worn equipment, thereby allowing the determination of the current condition and residual lifetime. Such information may allow an operator to decide whether or not a piece of equipment should be taken out of service for maintenance or allowed to continue operating.

The calibrated spectra may be measured previously in a laboratory, with new equipment, or can be calculated using analytic or numerical theoretical models or numerically simulated using ANSYS, STAR-CCM+ or similar modeling software.

EXAMPLE

The following example is illustrative only, and is not meant to limit the present disclosure in any way.

Sometimes there is no way to distinguish hydrodynamic acoustic noise spectra acquired from new equipment from those of eroded equipment without using special methods. Machine learning methods (e.g., linear regressions, random forests, etc.) or deep learning methods (e.g., fully connected neural networks, convolutional neural networks, etc.) may be used for spectral analysis or comparison, as well as evaluating the current condition of equipment and estimating residual lifetime. For example, hydrodynamic acoustic noise spectra in a model of a vortex mixer having different defects due to erosion are shown in FIG. 1. An explanation for the FIG. 1 legend is shown in Table 1.

TABLE 1

| Explanation of FIG. 1 legend. | | |
|---|---|---|
| Configuration | Cavity Diameter, mm | Cavity Depth, mm |
| 12_0 | 12 | 0 |
| 12_3.5 | 12 | 3.5 |
| 12_7 | 12 | 7 |
| 12_10.5 | 12 | 10.5 |

FIG. 1 shows hydrodynamic acoustic noise spectra for a vortex mixer without any defects (12_0), and three spectra with 12-mm cavities in the wall. The cavity depth increased gradually. Initially, it was 3.5 mm (12_3.5). Later, it increased to 7 mm (12_7) and then to 10.5 mm (12_10.5). FIG. 1 shows that the acoustic noise spectra for all these defects nearly coincide. Using traditional analytical methods, this may complicate the task of extracting patterns that are responsible for cavity depth changes. However, the task may be more easily solved using the deep learning approach. 200 spectra samples were acquired (50 per configuration). The following procedure was used to verify the deep learning approach.

Shuffling the spectra;

Random splitting: 160 spectra for training; 40 for the test;

Training the neural network with the 160 spectra; and

Using the 40 test spectra to infer cavity depth.

A fully connected neural network was used to determine cavity depth. The procedure described above was repeated eight times. The accuracies of each iteration are shown in Table 2.

TABLE 2

Accuracies of eight inferences of cavity depth,
determined from fully connected neural network.

| Accuracy, % | | | | | | | |
|---|---|---|---|---|---|---|---|
| 1 | 2 | 3 | 4 | 5 | 6 | 7 | 8 |
| 88 | 95 | 95 | 100 | 93 | 95 | 80 | 98 |
| Average | 93 | | | | | | |

Based on the above approach, cavity depth and diameter in the walls of fracturing equipment may be estimated. Such estimates versus time may be used to determine how much longer equipment may be operated before requiring maintenance.

The invention claimed is:

1. A method, comprising:
   (a) measuring a first discharge pressure versus revolutions per minute (RPM) in a first vortex mixer;
   (b) determining a condition of a second vortex mixer based on, at least in part, a second discharge pressure versus RPM in the second vortex mixer;
   (c) estimating a discharge pressure drift rate versus RPM;
   (d) predicting an expected time when the first vortex mixer will reach the condition of the second vortex mixer, wherein the expected time is predicted based on the first discharge pressure versus RPM, the second discharge pressure versus RPM, and the discharge pressure drift rate versus RPM;
   (e) monitoring the first vortex mixer over a period of time prior to the expected time to determine a current condition of the first vortex mixer, wherein the current condition of the first vortex mixer is based on, at least in part, the first discharge pressure versus RPM; and
   (f) removing the first vortex mixer for maintenance based on a correspondence between the current condition of the first vortex mixer and the condition of the second vortex mixer.

2. The method of claim 1, wherein stage (c) is performed with the first vortex mixer and the second vortex mixer.

3. The method of claim 1, wherein stage (c) is performed using laboratory measurements.

4. The method of claim 1, wherein stage (c) is performed using a modeling approach.

5. The method of claim 4, wherein the modeling approach comprises using software comprising ANSYS or STAR-CCM+.

6. The method of claim 1, wherein machine learning methods are used to perform stages (a)-(d), the machine learning methods comprising linear regression models, ensemble models or neural networks or combinations thereof.

7. The method of claim 1, wherein the first vortex mixer and the second vortex mixer are operated between 500 and 5000 RPM.

8. The method of claim 1, wherein a hydrophone or a high-frequency pressure gauge is employed to detect hydrodynamic acoustic noise.

9. A method, comprising:
   (a) measuring a first hydrodynamic acoustic noise spectra from first pumping equipment;
   (b) determining a condition of second pumping equipment based on, at least in part, a second hydrodynamic acoustic noise spectra from the second pumping equipment;
   (c) estimating a drift rate of the hydrodynamic acoustic noise spectra;
   (d) predicting an expected time when the first hydrodynamic noise spectra will reach that of the second pumping equipment, wherein the expected time is predicted based on the first hydrodynamic noise spectra, the second hydrodynamic acoustic noise spectra, and the determined hydrodynamic noise spectra drift rate;
   (e) monitoring the first pumping equipment over a period of time prior to the expected time to determine a current condition of the first pumping equipment based on, at least in part, the drift rate of the hydrodynamic acoustic noise spectra; and
   (f) removing the first pumping equipment for maintenance based on a correspondence between the current condition of the first pumping equipment and the condition of the second pumping equipment.

10. The method of claim 9, wherein stages (a)-(d) comprise monitoring the hydrodynamic acoustic noise from internal equipment surfaces.

11. The method of claim 9, wherein stages (a)-(d) comprise monitoring the hydrodynamic acoustic noise produced by flowing fluids.

12. The method of claim 9, wherein, during stages (a) (d), the hydrodynamic acoustic noise spectra cover a frequency range between 0 and 100 kHz.

13. The method of claim 9, wherein stage (c) is performed with mixing or pumping equipment.

14. The method of claim 9, wherein stage (c) is performed during laboratory experiments.

15. The method of claim 9, wherein a modeling approach is employed while monitoring the hydrodynamic acoustic noise spectra.

16. The method of claim 15, wherein the modeling approach comprises using software comprising ANSYS or STAR-CCM+.

17. The method of claim 9, wherein machine learning methods are used to perform stages (a)-(d), the machine learning methods comprising linear regression models, ensemble models or neural networks or combinations thereof.

18. The method of claim 9, wherein machine learning methods are used to perform stages (a) (d), the machine learning methods comprising linear regression models, ensemble models or neural networks or combinations thereof.

19. The method of claim 9, wherein measuring the first hydrodynamic acoustic noise spectra from the first pumping equipment is based on, at least in part, one or more geometric parameters of the first pumping equipment.

20. The method of claim 19, wherein the one or more geometric parameters of the first pumping equipment is determined based on sensor data from one or more sensors configured to acquire hydrodynamic noise.

* * * * *